United States Patent Office 3,079,442
Patented Feb. 26, 1963

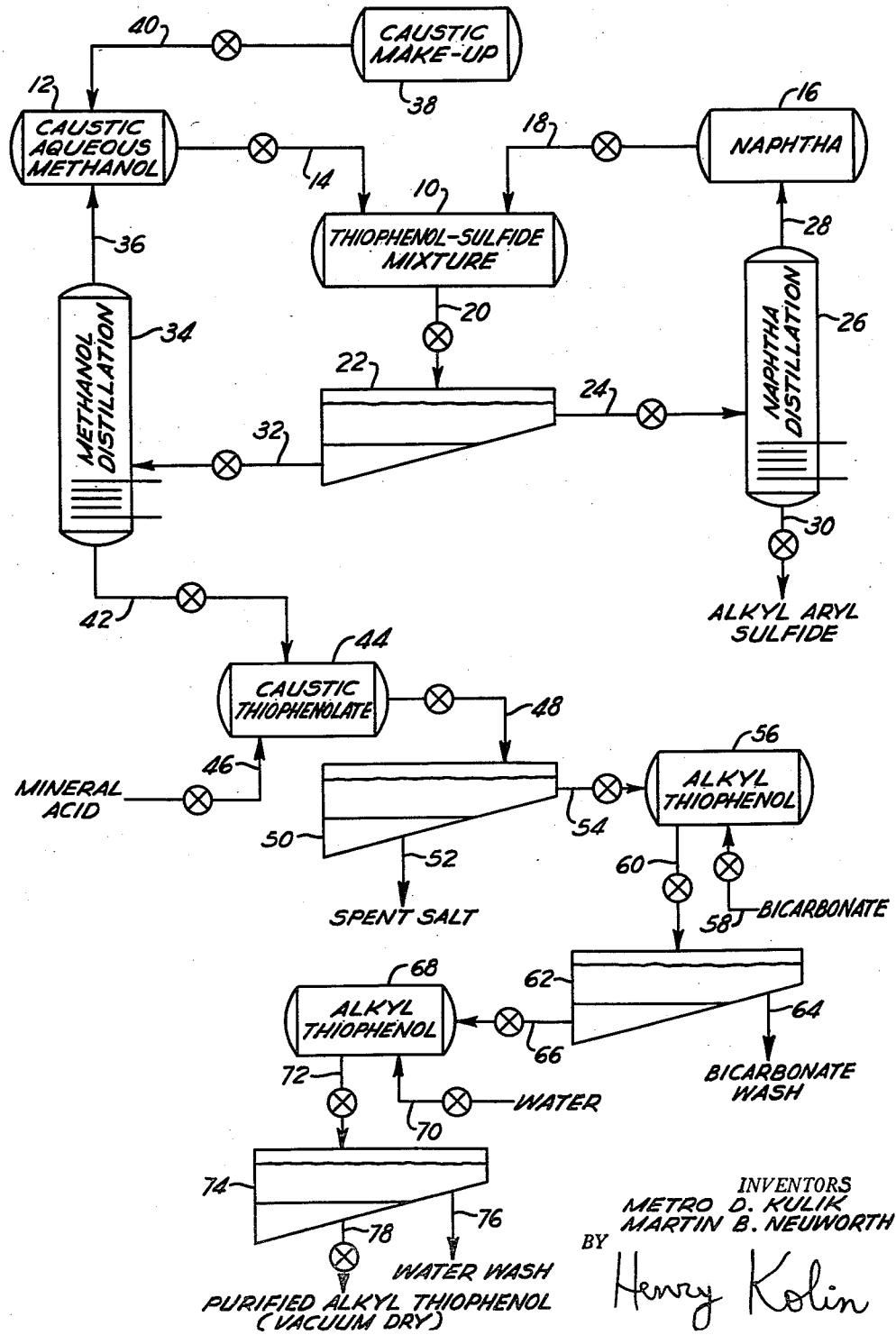

3,079,442
SEPARATION OF HIGHER ALKYLATED
THIOPHENOLS AND SULFIDES
Metro D. Kulik and Martin B. Neuworth, Pittsburgh, Pa., assignors to Consolidation Coal Company, Pittsburgh, Pa., a corporation of Pennsylvania
Filed Nov. 21, 1960, Ser. No. 70,596
13 Claims. (Cl. 260—609)

This invention relates to the art of refining alkylated thiophenols. More particularly it is concerned with separating a C-alkyl thiophenol alkylated in the ring with a higher alkyl group from the corresponding alkyl aryl sulfide.

The term "C-alkyl" is specific to an alkyl group substituted for a hydrogen atom in the ring of a thiophenol; "S-alkyl" refers to an alkyl group substituted for the hydrogen atom attached to the sulfur atom of a thiophenol to form an alkyl aryl sulfide. By "higher alkyl" reference is made to alkyl groups containing from 8 to 16 carbon atoms.

Some of the problems involved in the direct alkylation of thiophenols are well known. These have been pointed out in U.S. Patent 2,753,378. In methods that have been developed for the direct alkylation of thiophenols in the ring, S-alkyl product, i.e., alkyl aryl sulfide, is invariably formed in addition to the described C-alkyl product. Depending upon the specific process used, the sulfide may even be the predominant one formed. When a thiophenol is alkylated in the ring with a lower alkyl radical, e.g., a t-butyl group, the ring-alkylated thiophenol and the sulfide that are formed may be readily separated by distillation. The C-alkyl thiophenol may be obtained in a high degree of purity by this technique particularly where the sulfide is present as a minor constituent. Methods are now available for preparing the C-alkyl thiophenol in relatively high yield. The C-alkyl thiophenol may be further purified by treatment with an aqueous caustic solution, inasmuch as the alkyl aryl sulfide is insoluble therein; the C-alkyl thiophenol readily forms a caustic thiophenolate. The C-alkyl thiophenol is then "sprung" from the thiophenolate by treatment with a mineral acid.

However, when alkylation is attempted using higher molecular weight alkylating agents ($C_8$–$C_{16}$), yields of ring-alkylated product decrease. Also, effective separation between the isomeric C-alkyl thiophenol and alkyl aryl sulfide that are formed becomes more difficult because of the close and frequently overlapping boiling ranges of these products. Fine fractionation of the alkylation products is generally unsuccessful; a series of mixtures of the C-alkyl and S-alkyl thiophenols are produced as a consequence of the occurrence of co-distillation. Attempted separation of the higher alkylated thiophenols by use of aqueous caustic fails because of the formation of inseparable emulsions as a result of the surfactant properties of the higher alkylated thiophenols. Attempted addition of hydrocarbon solvents to the aqueous caustic to promote phase separation is also of no value since these solvents are incorporated within the emulsion. Attempted partitioning of the mixture of sulfide and thiophenol between hexane and ammonium hydroxide fails to produce any separation because of the insolubility of the C-alkyl thiophenol in the aqueous base. This invention provides the first means for effectively separating higher C-alkyl thiophenols from their corresponding sulfides. The process disclosed herein is particularly adaptable to commercial exploitation because of its simplicity and high degree of effectiveness.

It is accordingly an object of the present invention to provide a method for refining higher alkylated thiophenols.

It is a further object to provide a method for separating a higher C-alkyl thiophenol from its S-alkyl isomer.

It is still a further object to provide a method for preparing 4-nonylthiophenol in a high degree of purity.

It is yet another object to provide a method for preparing 4-dodecylthiophenol in a high degree of purity.

In accordance with this invention, a mixture of C-alkyl and S-alkyl thiophenols (alkyl group from $C_8$ to $C_{16}$) is separated into its components by being treated with a caustic aqueous alcohol solution. Sufficient caustic is used to stoichiometrically react with the C-alkyl thiophenol to form its caustic thiophenolate. A strong caustic is preferred. Sodium hydroxide and potassium hydroxide are exemplary and particularly preferred because of their high alkalinity, ready availability, and low cost. A low molecular weight alcohol ($C_1$ to $C_3$) should be used, e.g., methanol, ethanol, isopropanol. Methanol is particularly preferred because of its ready availability and low cost. It is further preferred because the solubility of caustic in alcohol increases with decreasing molecular weight. Thus if a higher alcohol is used in the caustic aqueous alcohol solution, more of the solution is required to provide the equivalent amount of caustic. Furthermore, with increasing molecular weight, alcohol increases in solubility in naphtha. This increase in solubility is undesirable for a preferred embodiment of this invention in which use is made of a combined caustic aqueous alcohol and naphtha treatment.

It is essential that the alcoholic solution used be an aqueous alcoholic one. A caustic aqueous alcohol solution containing about 30 to 70 percent alcohol, about 15 to 55 percent water, and about 8 to 30 percent caustic (all percentages by weight of solutions) is suitable. Deviations may be made from the percentages shown depending up on the specific caustic and alcohol selected for use and upon the nature and composition of the thiophenolic mixture to be refined. However, it should be noted that as the concentration of the caustic is increased, selectivity of separation decreases, sulfide tending to go into solution along with the ring-alkylated thiophenol. Too little caustic present allows emulsification to occur. Similarly, excess amounts of alcohol or water promote emulsification. Specific limits for a given system may be readily determined following the process described herein. Particularly preferred for use because of the ease of phase separation resulting and its effectiveness otherwise is a caustic aqueous alcohol solution containing from 35 to 65 weight percent methanol, from 20 to 50 weight percent water, and from 10 to 20 weight percent sodium hydroxide or potassium hydroxide (all percentages by weight of solution.)

In a particularly preferred embodiment of this invention, it has been found that emulsion formation is further minimized and rapid phase separation accelerated if a paraffinic naphtha solvent is used in conjunction with the caustic aqueous alcohol solution. The paraffinic naphtha solvent may be added prior to or concurrently with treatment of the C-alkyl thiophenol-sulfide mixture by caustic aqueous methanol. Less desirably, the naphtha treatment may follow the caustic treatment. It has been found convenient and phase separation appears most rapid when the naphtha and caustic aqueous alcohol solution are added concurrently.

Any paraffinic naphtha solvent such as obtained from the distillation of paraffinic petroleum stocks may ordinarily be used. The boiling range of a suitable naphtha solvent should be from 60 to 130° C., and preferably from 60 to 100° C. Its density should be less than 0.80. The hexane cut of paraffinic naphtha combines these various properties, and is further preferred as the naphtha solvent because of its ready availability and effectiveness.

Where both a hexane and alcoholic treatment of the alkylated feed are used, for each volume of feed from 0.5 to 2 volumes of naphtha and from 1 to 2 volumes of caustic aqueous alcohol are preferably used. Generally from 0.5 to 2 volumes of hexane will be used for each volume of alcohol. It is of course apparent that the specific composition of the alkylated feed, the concentration of caustic in the aqueous alcohol, and the like will determine the relative amounts of the alcoholic solution and of the naphtha to be used for the highest degree of effective extraction. For convenience, the process is effectively carried out at room temperature, although elevated temperatures may be used for specific applications.

For a more detailed description of this invention, in accordance with the objects and features thereof, reference should be made to the sole figure of the drawing, which is a diagrammatic flow sheet of the steps involved in practicing a preferred embodiment of this invention.

Referring to the drawing, a C-alkyl thiophenolsulfide mixture (e.g., 4-t-monylthiophenol and t-nonyl phenyl sulfide) contained in a vessel 10 is treated with a caustic aqueous methanol solution (e.g., 35–65 wt. percent methanol and 10–20 wt. percent NaOH) contained in a storage vessel 12, the solution flowing through a valved conduit 14. A paraffinic naphtha solvent (e.g. hexane) contained in a storage vessel 16 is passed through a valved conduit 18 also into vessel 10.

The concurrent contacting of the C-alkyl thiophenol-sulfide mixture by both the caustic aqueous methanol solution and the naphtha is generally preferred. For each volume of the mixture contained in vessel 10, from 1 to 2 volumes of the caustic aqueous methanol solution and from 0.5 to 2 volumes of naphtha is preferably used.

The treated mixture in vessel 10 is passed through a valved conduit 20 into a phase separator, e.g., a decanter 22, where phase separation rapidly occurs. The lighter layer, containing the caustic-insoluble alklyl aryl sulfide in the naphtha solvent is drawn off through a valved conduit 24 to a distillation column 26. The naphtha is recovered as an overhead distillation product through a conduit 28 and returned to vessel 16 for reuse in the process. The alkyl aryl sulfide is recovered as a bottoms product through a valved conduit 30. This sulfide is ordinarily recovered from the still in a high state of purity. Generally no further refining of this product is required.

The lower layer from decanter 22, containing the caustic-soluble C-alkyl thiophenol in aqueous methanol, is drawn off through a valved conduit 32 to a distillation column 34. The methanol is removed as an overhead product through a conduit 36 and returned to vessel 12 for reuse in the process. Since the caustic is consumed by chemical reaction with the thiophenol forming the caustic thiophenolate, caustic make-up is required for the caustic aqueous methanol solution. This caustic may be conveniently added from a vessel 38 through a valved conduit 40.

The caustic thiophenolate is recovered as a bottoms product from still 34. It is fed through a valved conduit 42 to a vessel 44. The C-alkyl thiophenol is "sprung" from the thiophenolate by treatment with a strong mineral acid (e.g., sulfuric, phosphoric, or hydrochloric acid) which is fed through a valved conduit 46 to vessel 44. The "sprung" solution is passed through a valved conduit 48 to a decanter 50. The lower layer contains the spent salt, e.g., sodium sulfate, which is removed through a conduit 52. The upper layer from decanter 50 is passed through a valved conduit 54 to a vessel 56.

If desired, the caustic thiophenolate prior to being sprung by mineral acid treatment may be washed with naphtha to remove any traces of sulfide present. This washing procedure would also be employed at this stage where there had been no prior contacting of the C-alkyl-thiophenol-sulfide mixture by the paraffinic naphtha solvent.

The C-alkyl thiophenol contained in vessel 56 is substantially free of sulfide and in a highly pure state. For further refining, to remove traces of inorganic and odor-forming organic acids that may be present, a bicarbonate solution (10% $NaHCO_3$) is added to vessel 56 through a valved conduit 58. The bicarbonate-treated C-alkyl thiophenol is passed through a valved conduit 60 to a decanter 62, where the upper bicarbonate wash layer is removed through a conduit 64. The lower thiophenolic layer is passed through a valved conduit 66 to a vessel 68. Water is added to vessel 68 through a valved conduit 70. The water serves to remove any traces of bicarbonate present. The washed thiophenol is passed through a valved conduit 72 to a decanter 74. The water wash, the upper layer, is removed through a conduit 76. The purified C-alkyl thiophenol is removed through a valved conduit 78. This product is preferably vacuum dried to remove any last traces of water which may be present.

The C-alkyl thiophenols are particularly useful as rubber peptizers. However, one disadvantage heretofore in their use has been the odor characterizing lower members of this series such as o-thiocresol. By the present process, the obtaining of higher molecular weight C-alkyl thiophenols, which are substantially odorless rubber peptizers, becomes of commercial significance.

The process disclosed herein is particularly suitable for separating the higher alkylated thiophenols produced in accordance with the process described in the copending application of Martin B. Neuworth, S.N. 70,443, filed of even date herewith, and assigned to the assignee of this invention. As described in the copending application, an alkylatable thiophenol containing meta and para positions that are "free" is converted to a para-substituted t-alkyl thiophenol in substantial yield by reacting it with a t-alkyl-generating olefinic alkylating agent under alklating conditions in the presence of a boron trifluoride-phosphoric acid complex as catalyst. Suitable $C_8$ to $C_{16}$ t-alkyl-generating olefins include diisobutylene, propylene trimer (nonene), 2-methylnonene, 2-methyl-1-decene, propylene tetramer (dodecene), 2-methyl-1-tridecene, propylene pentamer, 2-methyl-1-tetradecene, isobutylene tetramer, and tetraisobutylene.

For purposes of illustration, without limiting the scope of this invention, the process of this invention will be particularly described with reference to the separation of nonylated thiophenols and dodecylated thiophenols.

EXAMPLE 1.—PREPARATION AND PURIFICATION OF 4-NONYLTHIOPHENOL

One thousand grams of thiophenol (phenol-free) was charged into a 5-liter flask followed by 200 grams of $BF_3$-$H_3PO_4$ complex as catalyst. This catalyst was prepared as a reaction product of equimolar amounts of boron trifluoride and 100 percent phosphoric acid. The temperature was raised to 60° C., and, while maintaining vigorous stirring, 570 grams of nonene (propylene trimer) was added. The mole ratio of nonene to thiophenol was approximately 0.5; the catalyst concentration (weight percent based on thiophenol) was 20. The temperature was allowed to rise to 80° C. (exothermic reaction). After addition of the thiophenol was complete, the product was stirred for 5 hours at 80° C. Following this reaction period, the product was poured into a nitrogen-filled separatory funnel, and the catalyst was drawn off as a lower liquid phase. The supernatant liquid, protected by a nitrogen atmosphere, was neutralized with 5 percent sodium bicarbonate solution, washed with water, and decanted.

The composition of the crude reaction mixture (based on a thiophenol conversion of 43.0 percent) was as follows:

| Yield: | Mole percent of converted thiophenol |
|---|---|
| 4-t-nonylthiophenol | 51.1 |
| t-Nonyl phenyl sulfide | 40.6 |
| t-Nonyl-4-t-nonylphenyl sulfide | 8.3 |

An attempt to separate the 4-t-nonylthiophenol from the isomeric nonyl phenyl sulfide by distillation was unsatisfactory because a series of mixtures of the nonylthiophenol and the nonyl phenyl sulfide resulted due to co-distillation. However, because of the relatively high yield of nonylthiophenol obtained, about half of the nonylthiophenol present was obtained by a higher boiling fraction in a purity of 96 percent.

An attempt to separate the remaining nonylthiophenol from the nonyl phenyl sulfide by means of aqueous caustic extraction, which is satisfactorily employed for the lower alkyl thiophenols, was unsuccessful because of the formation of an inseparable emulsion as a result of the surfactant properties of the nonylthiophenol and the sulfide. The use of aqueous sodium hydroxide and potassium hydroxide solutions containing from 5 percent by weight to 18 percent by weight of alkali still resulted in emulsification occurring. An addition of a half volume of hexane was unsuccessful in breaking the emulsion. The solvent was merely incorporated into the emulsion.

However, it was found that the use of an aqueous methanol solution containing sodium hydroxide or potassium hydroxide dissolved therein was highly effective in separating the 4-t-nonylthiophenol from the nonyl phenyl sulfide. Surprisingly, methanol, a polar solvent, was apparently able to change the interfacial tension between the immiscible emulsified phases, eliminating emulsification. Yet this could not be accomplished by the sole use of a nonpolar solvent such as naphtha.

Upon addition of the caustic aqueous methanol solution, emulsion formation was minimized with fairly rapid phase separation occurring. The addition of hexane further decreased the time required for separation of the phases. These results are shown in Table I, all percentages being reported by weight of total solution.

*Table I*

EXTRACTION OF NONYLTHIOPHENOL

| Run No. | 1 | 2 | 3 | 4 | 5 |
|---|---|---|---|---|---|
| Sodium Hydroxide, grams | 10 | 10 | 10 | 10 | [1] 10 |
| Water, grams | 59.4 | 44.0 | 28.5 | 12.2 | 27.6 |
| Methanol, grams | 23.8 | 35.6 | 47.5 | 59.4 | 47.5 |
| Sodium Hydroxide, wt. percent | 10.7 | 11.2 | 11.6 | 12.3 | [1] 11.7 |
| Water, wt. percent | 63.8 | 49.0 | 33.2 | 14.9 | 32.4 |
| Methanol, wt. percent | 25.5 | 39.8 | 55.2 | 72.8 | 55.9 |
| Phase Separation A [2] (time, min.) | 10 | 15 | 12 | 12 | 12 |
| Phase Separation B [3] (time, min.) | ([4]) | 1 | 4 | ([4]) | 8 |

[1] Potassium hydroxide was used.
[2] After addition of caustic aqueous methanol. No hexane.
[3] After addition of 1 volume of caustic aqueous methanol and 0.5 volume of hexane.
[4] Emulsifies.

After the caustic extract was washed with hexane and the methanol removed by distillation, the nonylthiophenol was sprung from solution by treatment with dilute (3 N) sulfuric acid. The 4-t-nonylthiophenol was also diluted with water to eliminate possible inclusion therein of the precipitated inorganic salts. It was then decanted as an upper layer from solution. The hexane extraction, containing sulfides, was distilled to recover the hexane and sulfides. In accordance with the foregoing procedure, the 4-nonylthiophenol was obtained in a purity of 98.5 percent, as determined by thiol titration.

EXAMPLE 2.—DODECYLATION OF THIOPHENOL AND PURIFICATION OF THE PRODUCT

One thousand grams of thiophenol was charged to a reaction vessel together with 760 grams of dodecene (propylene tetramer). The mole ratio of dodecene to thiophenol was 0.5. Two hundred grams of $BF_3\text{-}H_3PO_4$ catalyst was used, amounting to 20 weight percent of catalyst based on thiophenol charged. The reaction conditions were otherwise similar to those described in Example 1 for the nonylation of thiophenol.

The following results were obtained (based on a thiophenol conversion of 44.0 percent):

| Yield: | Mole percent of converted thiophenol |
|---|---|
| 4-t-dodecylthiophenol | [1] 39.3 |
| t-Dodecyl phenyl sulfide | 50.6 |
| t-Dodecyl 4-t-dodecylphenyl sulfide | 10.1 |

[1] Contained slight amounts of 4-nonylthiophenol because of presence of some nonene in the dodecene.

The same procedure that was used for separating the nonylthiophenol from its sulfide was used for separating the 4-t-dodecylthiophenol from t-dodecyl phenyl sulfide. The dodecylthiophenol was obtained in 100 percent purity, i.e., completely free from sulfide, as determined by thiophenol titration.

According to the provisions of the patent statutes, we have explained the principle and preferred mode of operation of our invention and have illustrated and described what we now consider to represent its best embodiment. However, we desire to have it understood that, within the scope of the appended claims, the invention may be practiced otherwise than as specifically illustrated and described.

We claim:

1. The method for recovering a ring-alkylated alkyl thiophenol from a mixture of said alkyl thiophenol and an alkyl aryl sulfide having corresponding C-alkyl and S-alkyl groups of 8 to 16 carbon atoms, which comprises contacting said mixture under extractive conditions with a caustic aqueous alcohol solution to selectively extract said alkyl thiophenol therefrom as the alkali salt.

2. The method according to claim 1 wherein said caustic aqueous alcohol solution contains about 30 to 70 weight percent methanol, about 15 to 55 weight percent water, and about 8 to 30 weight percent caustic.

3. The method for recovering a ring-alkylated alkyl thiophenol from a mixture of said alkyl thiophenol and an alkyl aryl sulfide having corresponding C-alkyl and S-alkyl groups of 8 to 16 carbon atoms, which comprises contacting said mixture under extractive conditions with a caustic aqueous alcohol solution and a paraffinic naphtha fraction boiling within the range of 60 to 130° C. and having a density of less than 0.8 to selectively extract said alkyl thiophenol therefrom as the alkali salt.

4. The method according to claim 3 wherein said caustic aqueous alcohol solution contains 30 to 70 weight percent methanol, about 15 to 55 weight percent water, and about 8 to 30 weight percent caustic.

5. The method for recovering a ring-alkylated alkyl thiophenol from a mixture of said alkyl thiophenol and an alkyl aryl sulfide having corresponding C-alkyl and S-alkyl groups of 8 to 16 carbon atoms, which comprises contacting one volume of said mixture with about 1 to 2 volumes of a caustic aqueous alcohol solution and about 0.5 to 2 volumes of a paraffinic naphtha fraction boiling within the range of 60 to 130° C. and having a density of less than 0.8 to selectively extract said alkyl thiophenol therefrom as the alkali salt.

6. The method according to claim 5 wherein said caustic aqueous alcohol solution contains about 30 to 70 weight percent methanol, about 15 to 55 weight percent water, and about 8 to 30 weight percent caustic.

7. The method according to claim 6 in which the naphtha fraction is a hexane cut of petroleum naphtha.

8. In a method for the direct ring alkylation of a thiophenol wherein an alkylatable thiophenol is treated under ring-alkylating conditions with a t-alkyl-generating olefin containing from 8 to 16 carbon atoms whereby a mixture of ring-alkylated alkyl thiophenol and alkyl aryl sulfide is produced, said ring-alkylated thiophenol and said sulfide having corresponding C-alkyl and S-alkyl groups of 8 to 16 carbon atoms, the steps for separating said alkyl thiophenol from said sulfide which comprises contacting one volume of said mixture with about 1 to 2 volumes of a caustic aqueous methanol solution and about 0.5 to 2 volumes of a paraffinic naphtha fraction boiling within the range of 60° to 100° C. and having a density of less than 0.8, to form a methanol phase containing said alkyl thipheonl as the alkali salt and a naphtha phase containing said sulfide, separating the two phases, recovering the caustic thiophenolate from the methanol phase, and recovering the alkyl aryl sulfide from the naphtha phase.

9. The method according to claim 8 wherein said caustic aqueous methanol solution contains about 30 to 70 weight percent methanol, about 15 to 55 weight percent water, and about 8 to 30 weight percent of caustic selected from the group consisting of sodium hydroxide and potassium hydroxide.

10. In a method for the nonylation of thiophenol wherein thiophenol is treated under ring-nonylating conditions with pyropylene trimer whereby a mixture containing 4-t-nonylthiophenol and nonyl phenyl sulfide is formed, the steps for separating said nonylthiophenol from said sulfide which comprises contacting one volume of said mixture with (a) about 1 to 2 volumes of a caustic aqueous methanol solution containing about 35 to 65 weight percent methanol, about 20 to 50 weight percent water, and about 10 to 20 weight percent of caustic selected from the group consisting of sodium hydroxide and potassium hydroxide and (b) about 0.5 to 2 volumes of a paraffinic naphtha fraction boiling within the range of 60° to 100° C. and having a density of less than 0.8, to form a methanol phase containing said 4-t-nonylthiophenol as the alkali salt and a naphtha phase containing said sulfide, separating the two phases, recovering the caustic thiophenolate by distilling off the methanol therefrom and recovering the t-nonyl aryl sulfide by distilling off the naphtha therefrom.

11. The method according to claim 10 wherein the caustic thiophenolate recovered from the methanol phase is treated with mineral acid to spring the 4-t-nonylthiophenol therefrom, the 4-t-nonylthiophenol is then successively washed with bicarbonate, washed with water, and dried, and the dried 4-t-nonylthiophenol is recovered in a purity between 95 and 100 percent as determined by thiophenol titration.

12. In a method for the dodecylation of thiophenol wherein thiophenol is treated under ring-dodecylating conditions with propylene tetramer whereby a mixture containing 4-t-dodecylthiophenol and dodecyl phenyl sulfide is formed, the steps for separating said dodecylthiophenol from said sulfide which comprises contacting one volume of said mixture with (a) about 1 to 2 volumes of a caustic aqueous methanol solution containing about 35 to 65 weight percent methanol, about 20 to 50 weight percent and about 10 to 20 weight percent of caustic selected from the group consisting of sodium hydroxide and potassium hydroxide, and (b) about 0.5 to 2 volumes of a paraffinic naphtha fraction boiling within the range of 60° to 100° C. and having a density of less than 0.8, to form a methanol phase containing said 4-t-dodecylthiophenol as the alkali salt and a naphtha phase containing said sulfide, separating the two phases, recovering the caustic thiophenolate by distilling off the methanol therefrom and recovering the t-dodecyl aryl sulfide by distilling off the naphtha therefrom.

13. The method according to claim 12 wherein the caustic thiophenolate recovered from the methanol phase is treated with mineral acid to spring the 4-t-dodecylthiophenol therefrom, the 4-t-dodecylthiophenol is then successively washed with bicarbonate, washed with water, and dried, and the dried 4-t-dodecylthiophenol is recovered in a purity between 95 and 100 percent as determined by thiophenol titration.

References Cited in the file of this patent

UNITED STATES PATENTS 2,753,378  Kreuz ----------------- July 3, 1956